US012585147B2

(12) United States Patent
Panuski et al.

(10) Patent No.: US 12,585,147 B2
(45) Date of Patent: Mar. 24, 2026

(54) PARALLEL MICROCAVITY TRIMMING BY STRUCTURED-LASER ILLUMINATION

(71) Applicant: Massachusetts Institute of Technology, Cambridge, MA (US)

(72) Inventors: Christopher Louis Panuski, Somerville, MA (US); Ian Robert Christen, Cambridge, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 738 days.

(21) Appl. No.: 17/898,147

(22) Filed: Aug. 29, 2022

(65) Prior Publication Data

US 2024/0069368 A1      Feb. 29, 2024

(51) Int. Cl.
| | |
|---|---|
| *G02B 6/10* | (2006.01) |
| *B23K 26/362* | (2014.01) |
| *G02F 1/025* | (2006.01) |
| *B23K 101/40* | (2006.01) |

(52) U.S. Cl.
CPC ............ *G02F 1/025* (2013.01); *B23K 26/362* (2013.01); *B23K 2101/40* (2018.08)

(58) Field of Classification Search
CPC ... G02F 1/025; B23K 26/362; B23K 2101/40; B23K 26/032; B23K 2103/56; G02B 6/10
See application file for complete search history.

(56) References Cited

U.S. PATENT DOCUMENTS

| | | | | |
|---|---|---|---|---|
| 8,077,313 B2* | 12/2011 | Furuki | .................. | B01L 3/5027 |
| | | | | 356/337 |
| 9,638,632 B2* | 5/2017 | Bornhop | ................ | G01N 21/45 |
| 11,022,826 B2 | 6/2021 | Panuski et al. | | |
| 2018/0217412 A1* | 8/2018 | Koponen | ............... | G02B 6/255 |
| 2021/0240016 A1 | 8/2021 | Panuski et al. | | |

OTHER PUBLICATIONS

Asano et al. "Photonic crystal nanocavity with a Q factor exceeding eleven million." Optics express 25.3 (2017): 1769-1777.

Benea-Chelmus et al. "Electro-optic spatial light modulator from an engineered organic layer." Nature communications 12.1 (2021): 1-10.

Chen et al. "Selective tuning of high-Q silicon photonic crystal nanocavities via laser-assisted local oxidation." Optics express 19.13 (2011): 12480-12489.

Chung et al. "A monolithically integrated large-scale optical phased array in silicon-on-insulator CMOS." IEEE Journal of Solid-State Circuits 53.1 (2017): 275-296.

(Continued)

*Primary Examiner* — Jennifer Doan

(74) *Attorney, Agent, or Firm* — Smith Baluch LLP

(57) ABSTRACT

Methods and systems are described for precisely adjusting characteristics of microfabricated devices after device fabrication. The adjustments can be carried out in parallel on a plurality of the microfabricated devices. By carrying out the adjustment process, uniformity of feature sizes to a few picometers (one standard deviation) and corresponding uniformity of operating characteristics for a plurality of microfabricated devices are possible.

12 Claims, 7 Drawing Sheets

(56)        References Cited

OTHER PUBLICATIONS

Hassan et al. "Ultra-high frame rate digital light projector using chipscale LED-on-CMOS technology." arXiv preprint arXiv:2111. 13586 (2021), 20 pages.
Horie et al. "High-speed, phase-dominant spatial light modulation with silicon-based active resonant antennas." Acs Photonics 5.5 (2017): 1711-1717.
Hornbeck "128×128 deformable mirror device." IEEE Transactions on Electron Devices 30.5 (1983): 539-545.
Hu et al. "Experimental realization of deep-subwavelength confinement in dielectric optical resonators." Science advances 4.8 (2018): eaat2355, 7 pages.
Kim et al. "A single-chip optical phased array in a wafer-scale silicon photonics/CMOS 3D-integration platform." IEEE Journal of solid-state circuits 54.11 (2019): 3061-3074.
Lee et al. "Local tuning of photonic crystal nanocavity modes by laser-assisted oxidation." Applied Physics Letters 95.19 (2009): 191109, 3 pages.
Li et al. "Electrically-controlled digital metasurface device for light projection displays." Nature communications 11.1 (2020): 1-7.
Lie et al. "High pressure oxidation of silicon in dry oxygen." Journal of The Electrochemical Society 129.12 (1982): 2828 8 pages.
Mcknight et al. "256×256 liquid-crystal-on-silicon spatial light modulator." Applied Optics 33.14 (1994): 2775-2784.
Minkov et al. "Automated optimization of photonic crystal slab cavities." Scientific reports 4.1 (2014): 1-8.
Minkov et al. "Photonic crystal slab cavity simultaneously optimized for ultra-high Q/V and vertical radiation coupling." Applied Physics Letters 111.13 (2017): 131104, 5 pages.
Nozaki et al. "Sub-femtojoule all-optical switching using a photonic-crystal nanocavity." Nature Photonics 4.7 (2010): 477-483.
Panuski et al. "A full degree-of-freedom photonic crystal spatial light modulator." arXiv preprint arXiv:2204.10302 (2022), 25 pages.

Park et al. "All-solid-state spatial light modulator with independent phase and amplitude control for three-dimensional LiDAR applications." Nature nanotechnology 16.1 (2021): 69-76.
Peng et al. "Design of high-speed phase-only spatial light modulators with two-dimensional tunable microcavity arrays." Optics express 27.21 (2019): 30669-30680.
Piccardo et al. "Roadmap on multimode light shaping." Journal of Optics 24.1 (2021): 013001, 54 pages.
Poulton et al. "8192-element optical phased array with 100° steering range and flip-chip CMOS." Cleo: QELS_Fundamental Science. Optical Society of America, 2020, 2 pages.
Rogers et al. "A universal 3D imaging sensor on a silicon photonics platform." Nature 590.7845 (2021): 256-261.
Shaltout et al. "Spatiotemporal light control with active metasurfaces." Science 364.6441 (2019): eaat3100 12 pages.
Shirmanesh et al. "Electro-optically tunable multifunctional metasurfaces." ACS nano 14.6 (2020): 6912-6920.
Shuai et al. "Coupled bilayer photonic crystal slab electro-optic spatial light modulators." IEEE Photonics Journal 9.2 (2017): 1-11.
Smolyaninov et al. "Programmable plasmonic phase modulation of free-space wavefronts at gigahertz rates." Nature Photonics 13.6 (2019): 431-435.
Sun et al. "Large-scale nanophotonic phased array." Nature 493. 7431 (2013): 195-199.
Tzang et al. "Wavefront shaping in complex media with a 350 kHz modulator via a 1D-to-2D transform." Nature Photonics 13.11 (2019): 788-793.
Wang et al. "2D broadband beamsteering with large-scale MEMS optical phased array." Optica 6.5 (2019): 557-562.
Wang et al. "Optically reconfigurable metasurfaces and photonic devices based on phase change materials." Nature photonics 10.1 (2016): 60-65.
Yang et al. "High speed optical phased array using high contrast grating all-pass filters." Optics express 22.17 (2014): 20038-20044.

* cited by examiner

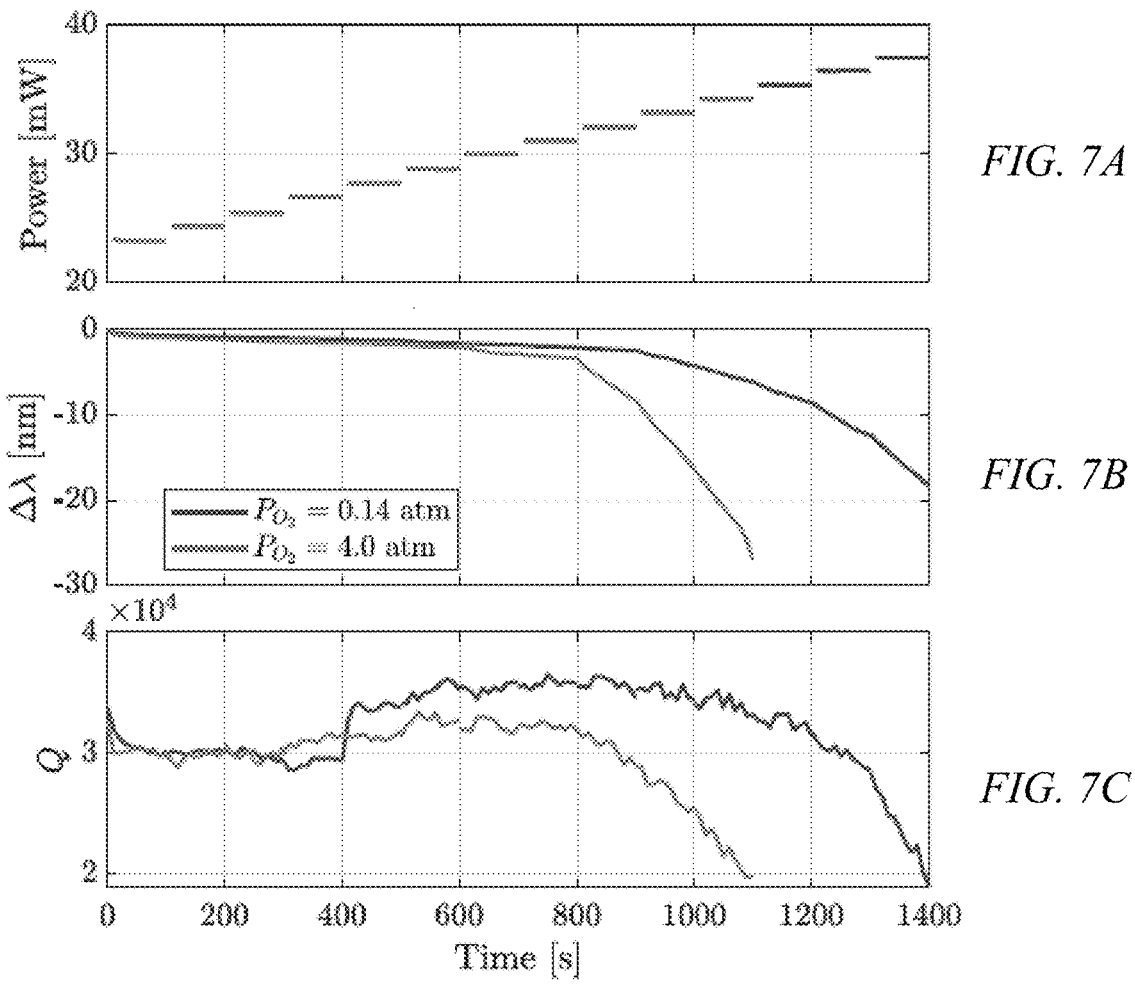
*FIG. 7A*
*FIG. 7B*
*FIG. 7C*
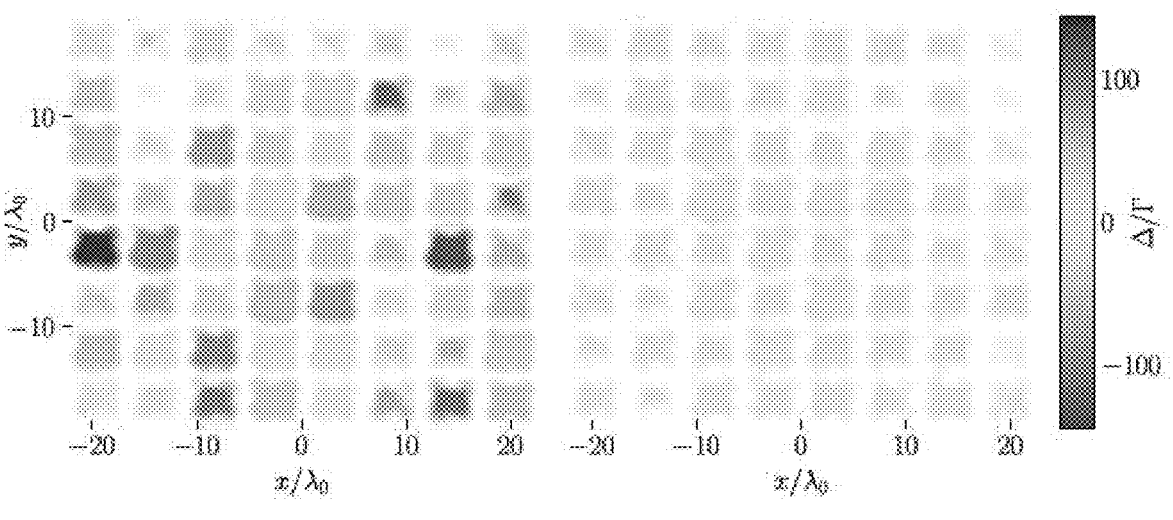
*FIG. 8A*                    *FIG. 8B*

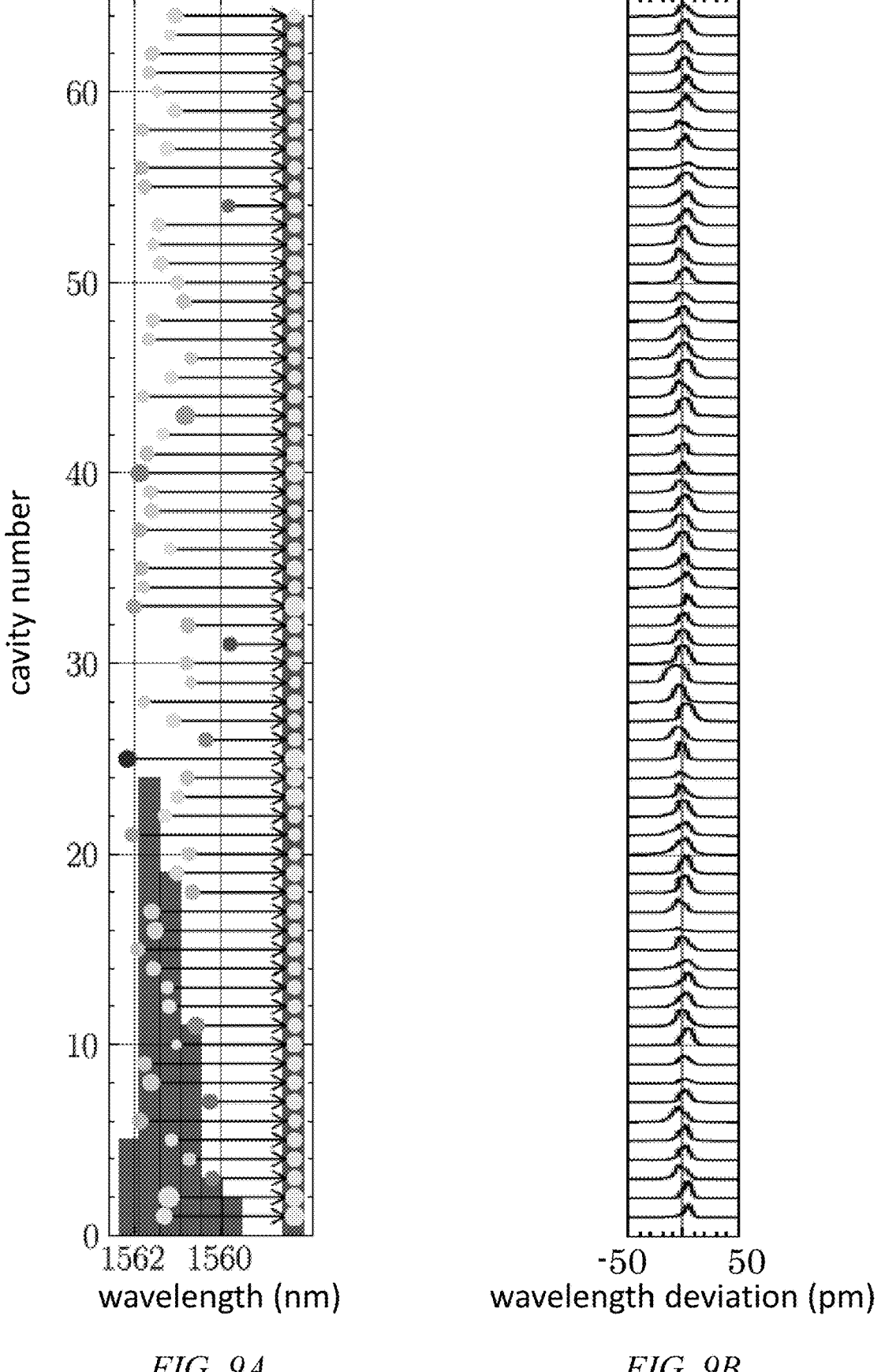
*FIG. 9A*                      *FIG. 9B*

PARALLEL MICROCAVITY TRIMMING BY STRUCTURED-LASER ILLUMINATION

STATEMENT OF GOVERNMENT RIGHTS

This invention was made with government support under W911NF20-1-0084 awarded by the U.S. Army Research Office. The government has certain rights in the invention.

BACKGROUND

Spatial light modulators (SLMs) are used in many different fields of science and technology. Applications for SLMs range from commercial imaging devices (e.g., projectors, imagers, and adaptive optics) to research in the areas of microscopy, metrology, optical lithography, machine learning, and quantum computing among other technologies. Generally, an SLM has an array of pixels where optical modulators at the pixels can be independently controlled to modulate the amplitude and/or phase of spatial regions of an optical beam that is incident on the SLM. The pixel size is typically on the order of microns (i.e., approaching the wavelength of light). By modulating small spatial regions of an optical beam, various beam transformations can be performed, such as focusing, defocusing, collimating, phase front correction, pattern generation, Fourier transformation, etc.

There are at least three types of SLMs. One type uses liquid crystals for the pixels to modulate the phase and/or polarization of light incident on the pixels. Passing the phase-modulated light through polarizers can modulate the amplitude at each pixel. Some of these SLMs may be referred to as liquid-crystal-on-silicon (LCOS) SLMs. Because of the liquid crystal's natural response, the modulation speed of a LCOS SLM is limited to speeds on the order of 100 Hz.

A second type of SLM uses microelectromechanical system (MEMS) movable mirrors or reflective deformable ribbons for the pixels. These mirrors or ribbons redirect or scatter the incident light to modulate the amplitude at each pixel. These SLMs can be modulated at significantly higher speeds (up to about 100 kHz) and may be referred to as a digital micromirror device (DMD).

A third type of SLM uses resonant optical cavities formed from semiconductor material for pixels. The optical cavities can be designed to transmit or reflect incident light at the resonant wavelength. The resonant wavelength of the optical cavity can be modulated by changing the refractive index of the optical cavity by free-carrier injection, electro-optic tuning, thermal tuning, mechanical deformation, and more. For free-carrier injection, an array of incoherent light sources (such as light-emitting diodes) can be used to generate free carriers in each optical cavity and thereby modulate the resonant wavelength for each pixel, which in turn can modulate the amplitude of light reflected from or transmitted through each pixel. In general, these weak but fast effects require resonant enhancement to significantly modulate the incident light. Therefore, these SLMs may be referred to as resonant SLMs and their modulation speeds can be up to at least 10 MHz or higher. Further details of resonant SLMs are described in U.S. Patent Application publication No. 2021/0018767, titled "High-Speed Wavelength-Scale Spatial Light Modulators with Two-Dimensional Tunable Microcavity Arrays," filed May 18, 2020, which application is herein incorporated by reference in its entirety.

SUMMARY

The described implementations relate to nanofabrication processes to adjust characteristics (e.g., feature sizes and/or operating characteristics) of resonant optical cavities formed in semiconductor material. Using the processes, a plurality of micro-scale optical cavities in an array can be trimmed after their initial fabrication, so that their resonant wavelengths are approximately equal to within a few picometers (e.g., their standard deviation is less than 5 pm). In other implementations, the microcavities can be trimmed precisely to different desired wavelengths (e.g, within a few picometers of a desired wavelength for each microcavity). The process to adjust or trim the optical cavities involves carefully-controlled oxidation of semiconductor material forming the optical cavity. The trimming process can be performed in parallel on a plurality of optical cavities in an array.

Some implementations relate to a method for adjusting characteristics of a plurality of microfabricated devices in parallel. The method can include acts of: measuring an initial characteristic of each microfabricated device of the plurality of microfabricated devices; determining, based on the initial characteristics for each microfabricated device, a target characteristic; selecting two or more microfabricated devices from among the plurality of microfabricated devices whose characteristics should be adjusted toward the target characteristic; directing a plurality of optical beams onto the two or more microfabricated devices to thereby adjust in parallel the characteristics of the two or more microfabricated devices toward the target characteristic; measuring in parallel an adjusted characteristic of each microfabricated device of the two or more microfabricated devices; and determining whether the adjusted characteristics measured for the two or more microfabricated devices are within an acceptable range of values.

Some implementations relate to a microfabricated apparatus comprising a plurality of resonant optical cavities formed in a semiconductor, wherein two or more resonant optical cavities of the plurality of resonant optical cavities include oxide layers of different thicknesses formed on their surfaces such that a standard deviation of resonant wavelengths measured for the plurality of resonant optical cavities is between 1 pm and 100 pm.

Some implementations relate to a microfabricated apparatus comprising a plurality of devices formed in a semiconductor, wherein two or more devices of the plurality of devices include oxide layers of different thicknesses formed on their surfaces such that a dimension measured for a same feature of each device of the plurality of devices, including the oxide layers of different thicknesses, is within 100 picometers of an average value of the dimension determined for the plurality of devices.

Some implementations relate to a microfabricated apparatus comprising a plurality of devices formed in a semiconductor (e.g., a semiconductor chip), wherein two or more devices of the plurality of devices have characteristics (e.g., resonant wavelength, feature size, layer thickness) that have been trimmed after fabrication and initial testing in a high-pressure oxygen chamber. The trimming can result in the characteristic being more uniform among the plurality of devices or closer to one or more target characteristics for all devices than would be possible using the microfabrication process only. For example, the microfabrication process used to make the devices may inherently cause variations in the characteristic that exceeds what is measured for the trimmed devices.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar components).

FIG. 7A plots step increases in optical power that is incident on a photonic crystal cavity for a trimming characterization procedure.

FIG. 7B plots resonant wavelength detuning as a function of time for two different oxygen environments and the trimming characterization procedure of FIG. 7A.

FIG. 7C plots resonator quality factor Q as a function of time during the trimming characterization procedure of FIG. 7A.

FIG. 8A plots reflected intensity and indicates resonant wavelength variations for an 8×8 array of photonic crystal cavities as fabricated.

FIG. 8B plots the reflected intensity and the resonant wavelength variations for the 8×8 array of photonic crystal cavities of FIG. 8A after the cavities have been trimmed by localized oxidation.

FIG. 9A plots measured resonant wavelengths for the 64 photonic crystal cavities of FIG. 8A and FIG. 8B, before and after trimming.

FIG. 9B plots reflected intensity as a function of wavelength (relative to a target wavelength value) from the 64 photonic crystal cavities of FIG. 8B (after trimming). The plots indicate alignment of the resonant wavelengths to the few picometer level.

DETAILED DESCRIPTION

I. Overview of a Resonant Spatial Light Modulator

High quality-factor (Q), small volume (V) optical "microcavities" are a backbone of optical technologies: they improve sensitivity, enhance light-matter interactions, and shape optical fields. Microcavities can be used in a variety of applications ranging from communications, imaging, and biochemical sensing. Advances in theory, design, and fabrication advances continue to improve their performance, enabling recent demonstrations of quality factor-to-normalized mode volume (Q/V) ratios in excess of $10^7$ (where the mode volume V is normalized to the wavelength cubed in the microcavity's medium). Tiling these cavities into large-scale arrays would enable a range of applications including programmable filter arrays for wavelength division multiplexing, hyperspectral imagers, resonant spatial light modulators (SLMs), as well as other integrated optical devices. However, these applications require passive, non-volatile control of each microcavity's resonant wavelength to counteract fabrication variability. The methods introduced here solve that problem and allow fabrication of a resonant SLM having an array of optical microcavities with their resonant wavelengths trimmed to picometer-order uniformity.

Figure 1:
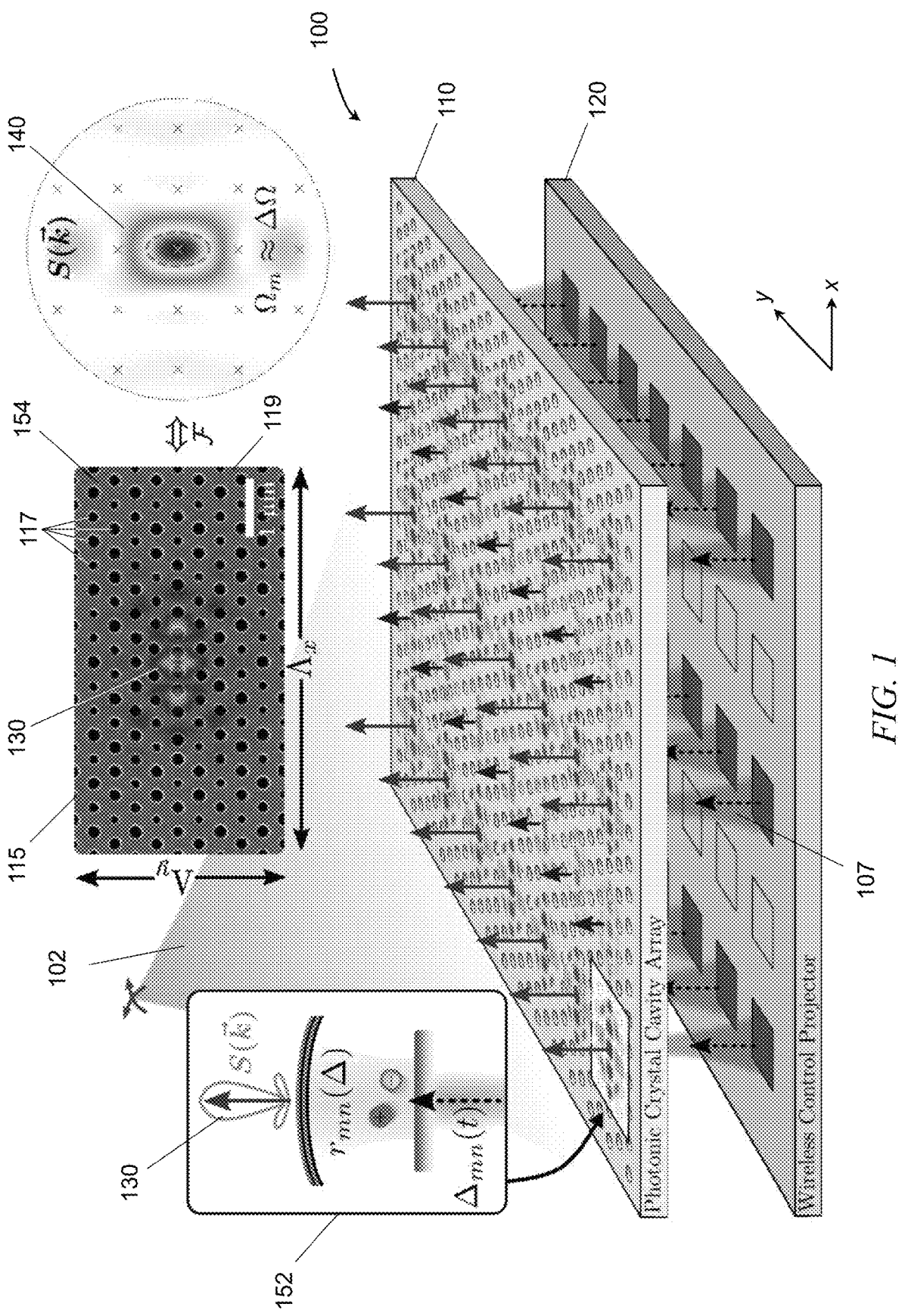
FIG. 1 depicts an example of a resonant spatial light modulator that uses optically-controlled photonic crystal cavities for micro-scale, resonant optical cavities of the SLM.

FIG. 1 depicts an example of a resonant spatial light modulator; in this case, an all-optical SLM 100. This SLM comprises a photonic crystal (PhC) cavity array 110 and a wireless control projector 120. Generally, the PhC cavity array 110 can have M×N pixels comprising resonant optical cavities that can operate in reflection mode or transmission mode. Control light 107 from the wireless control projector 120 can be shone on each pixel independently of other pixels to create free carriers in each pixel, as depicted in the inset illustration 152. The free carriers modulate the refractive index of the pixel's photonic crystal cavity (a resonant optical cavity), thereby changing the complex reflection coefficient $r_{mn}(\Delta)$ or complex transmission coefficient $t_{mn}(\Delta)$ of each pixel. Accordingly, pixel-by-pixel modulation of multiple spatial regions of an optical beam can be performed with the SLM 100.

For the illustrated example, the PhC cavity array 110 comprises a 5×7 pixel array of resonant optical cavities that operate in reflection mode. In some implementations, the number of pixels in the array 110 can be much larger than 35. There can be hundreds, thousands, tens of thousands, hundreds of thousands, or even millions of pixels. An incident beam 102 is reflected by each pixel depending on the complex reflection coefficient $r_{mn}(\Delta)$ of each pixel.

A scanning-electron micrograph 154 in FIG. 1 shows further details of each pixel 115. Each pixel 115 includes a photonic crystal cavity which comprises an array of nanoscale holes 117 formed in a semiconductor layer 119 (e.g., a membrane). The holes may be patterned using deep-ultraviolet photolithography and etched into the semiconductor layer using reactive ion etching, for example. The semiconductor layer 119 may comprise mostly or all silicon, or can be formed from another semiconductor material such as indium phosphide (InP), gallium arsenide (GaAs), aluminum gallium arsenide (AlGaAs), gallium phosphide (GaP), aluminum gallium phosphide (AlGaP), gallium nitride (GaN), indium gallium nitride (InGaN), etc. The selection of semiconductor or semiconductor alloy can depend upon the wavelength for which the SLM is designed to operate. In some implementations, the semiconductor layer 119 is a membrane of silicon formed from a silicon layer of a silicon-on-insulator (SOI) wafer. The thickness of the semiconductor layer 119 can be from 50 nm to 1000 nm, for example, and can depend upon the wavelength for which the SLM is designed.

The size and arrangement of nanoscale holes 117 in each pixel 115 determine the near-field optical mode 130 reflected or transmitted from each pixel 115. The pattern of nanoscale holes 117 for the example SLM depicted in FIG. 1 corresponds to an L4/3 photonic crystal cavity. This cavity supports the simulated near-field optical mode 130 that is overlaid on the micrograph 154. The far-field mode profile 140 of the near-field optical mode 130 is shown in the simulated far-field plot in FIG. 1. The far-field mode profile 140 is confined near the zeroth diffraction order for each pixel (indicated by the crosses in the simulated plot) providing near unity fill factor and high diffraction efficiency for each pixel 115. Further details of an all-optical modulator can be found in U.S. Pat. No. 11,022,826, titled "All-Optical Spatial Light Modulators," issued Jun. 1, 2021, which is incorporated by reference in its entirety.

Although the example of FIG. 1 implements an L4/3 photonic crystal cavity, other photonic crystal cavity designs can be used for the PhC cavity array 110. Other designs include, but are not limited to L7, L5, and L3 photonic crystal cavities. In some implementations, there can be a mix of two or more photonic crystal cavity designs in the PhC cavity array 110. Since the resonant wavelengths of the photonic crystal cavities in the PhC cavity array 110 can be detuned independently of each other by the wireless control projector 120 to affect the optical mode reflected or transmitted at each pixel 115 and sub-region of the incident beam 102, the SLM (when illuminated by coherent radiation) can operate as a programmable, multimode-interference, beamforming SLM that can transform the incident beam 102 into nearly any desired output beam shape or pattern. Further, the invention is not limited to PhC cavities. Other types of microcavities can be used at the pixels 115 (e.g., pillars, micro-rings, micro-toroids, micro-bottles, slab-defect cavities, or any other cavity hosting an optical mode in an oxidizable medium).

To improve spatial light modulation and better harness the full complexity of the optical fields, the inventors have recognized and appreciated that one of the challenges in making an all-optical SLM 100 is to align resonant wavelengths of the photonic crystal cavities in the PhC cavity array 110 to deep-sub-nanometer levels and preferably picometer levels. For example, to improve multimode interference, emission from each pixel 115 of the PhC cavity array 110 is preferably at the same wavelength and intensity when each pixel is fully "on" (e.g., controlled by the wireless control projector 120 to have a highest reflectivity at the incident beam's wavelength). Because of typical microfabrication variances, the sizes of the nanoscale holes 117 and/or positions can unintentionally vary across the PhC cavity array 110 from their intended sizes and/or positions. These variations can cause unwanted variations in the resonant wavelengths $\lambda_o$ of the pixels' photonic crystal cavities and thereby degrade the SLM's performance.

The inventors have recognized and appreciated that obtaining identical or nearly identical resonant wavelengths $\{\lambda_o\}$ for the pixels 115 (e.g., resonant wavelengths with a standard deviation significantly less than one nanometer) is not practically achievable with current wafer-scale microfabrication processes. (In the resonant wavelength notation, the brackets "{ }" are used to indicate an ensemble of wavelengths.) This is because nanometer-level fabrication fluctuations translate to nanometer-level variations in resonant wavelengths, which are in excess of the resonant linewidth for photonic crystal cavities with sufficiently high quality factor (Q) values (e.g., on the order of $10^3$ or higher). As an example, a state-of-the-art, 8×8 PhC cavity array of L3 cavities (chosen to balance constraints on resonator Q, resonator volume V, directive emission, and fabrication tolerance) typically has a peak-to-peak wavelength variation spanning ~3 nm. Such a variation can correspond to hundreds of linewidths for a target resonator Q value of about $10^5$.

To reduce the nonuniformity in resonant wavelengths of the photonic crystal cavities, the inventors conceived and demonstrated an automated, low-loss, and picometer-precision trimming procedure based on laser-assisted thermal oxidation that can be used to trim microcavities in parallel. The trimming process can be carried out after fabrication of the PhC cavity array 110. Two features of the process improve the speed and pixel-to-pixel controllability over prior approaches that were implemented on single pixels: 1) accelerated oxidation in a high-pressure chamber with in-situ characterization; and 2) holographic fanout of the trimming laser to simultaneously address multiple pixels 115 in the PhC cavity array 110.

II. Overview of Trimming Process Applied to Photonic Crystal Cavities

Figure 2A:
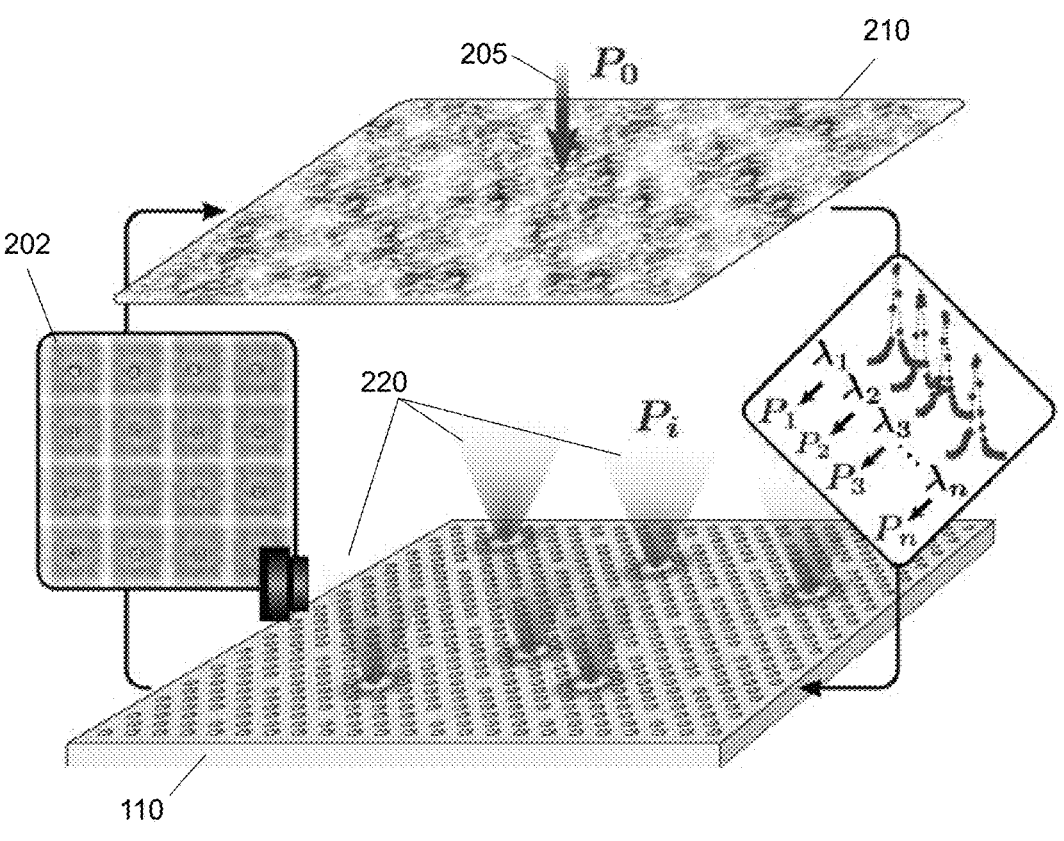
FIG. 2A is a graphical depiction of a trimming process that can be implemented on a photonic crystal (PhC) cavity array used in the SLM of FIG. 1.
Figure 2B:
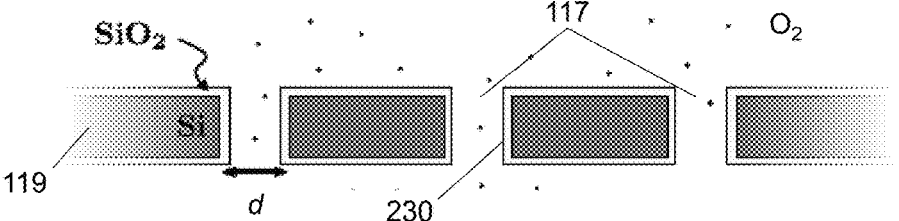
FIG. 2B depicts an oxide layer that is formed on a semiconductor layer of a PhC cavity array to adjust resonant wavelengths of the photonic crystal cavities.

FIG. 2A is a general depiction of the trimming process, which iterates through several loops. In a loop, an optical measurement 202 (described further in connection with FIG. 3 and FIG. 4) is made to determine a resonant wavelength for each photonic crystal cavity in the PhC cavity array 110. A number N of the photonic crystal cavities having a similar deviation from a target resonant wavelength are selected for localized oxidation of the semiconductor layer 119. In FIG. 2A, N=6. An SLM 210 (e.g., a liquid crystal SLM) is used to transform an incident beam of light 205 into N beamlets 220 that are focused onto the N selected photonic crystal cavities. The focused beams and a pressurized oxygen environment are used to locally oxidize the semiconductor layer 119, forming an oxide layer 230, and changing the effective diameters d of the nanoscale holes 117, as depicted in FIG. 2B. The removal of silicon during the oxidation process blue-shifts the resonant wavelength of the photonic crystal cavity. The amount of power Pi in the beamlets and exposure time ti for the N selected cavities depends upon the deviation of the resonant wavelength from a target wavelength and the oxidation rate, both of which can be determined before trimming is carried out and reevaluated and updated during the trimming process. Resonant wavelength measurements can be repeated for each loop iteration, as described in further detail below. By selecting appropriate power levels Pi and exposure times ti for each deviated group of photonic crystal cavities and for each loop iteration, the resonant wavelengths of all photonic crystal cavities in the PhC cavity array 110 can be made equal to within a few picometers.

Figure 2C:
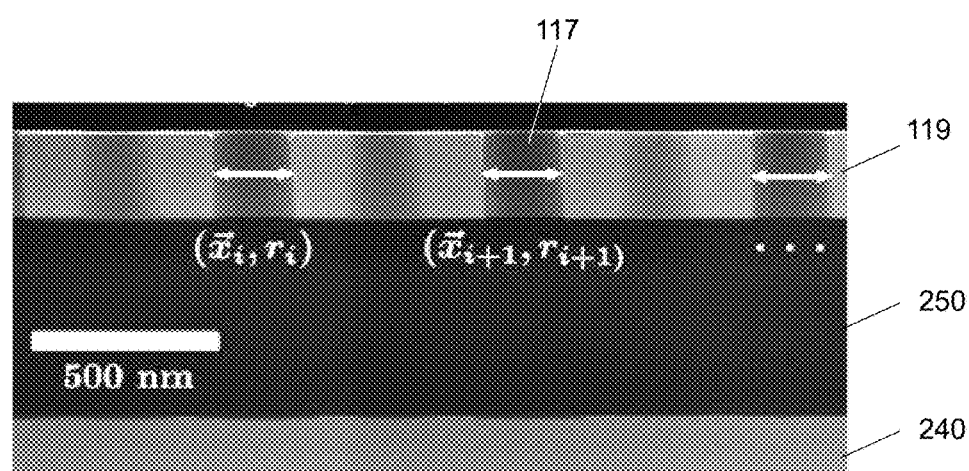
FIG. 2C is a transmission electron microscope (TEM) micrograph of a portion of a semiconductor layer containing photonic crystal cavities.

FIG. 2C is a TEM micrograph showing a portion of the semiconductor layer 119 (a suspended membrane for this implementation) which has undergone a trimming process. The local oxide layer 230 is only a few nanometers thick and is not discernable in the micrograph. For an array of trimmed photonic crystal cavities, there can be variations in oxide thickness from cavity to cavity since different cavities may be trimmed by different amounts. Accordingly, the thicknesses of the different oxide layers can have different values in a range between 10 pm and 10 nm for some trimmed devices. Smaller and larger thicknesses may be present in some cases.

The semiconductor layer 119 in FIG. 2C is suspended over the insulating oxide layer 240 of an SOI wafer from which the PhC cavity array 110 is fabricated. The insulating oxide layer 240 has been isotropically etched away from the underside of the semiconductor layer 119 (prior to trimming). The etching effectively creates a suspended membrane from the semiconductor layer 119 and leaves an air gap 250 between the semiconductor layer 119 and the insulating oxide layer 240.

III. Further Description of a Sub-Nanometer Precision Trimming Process

Figure 3:
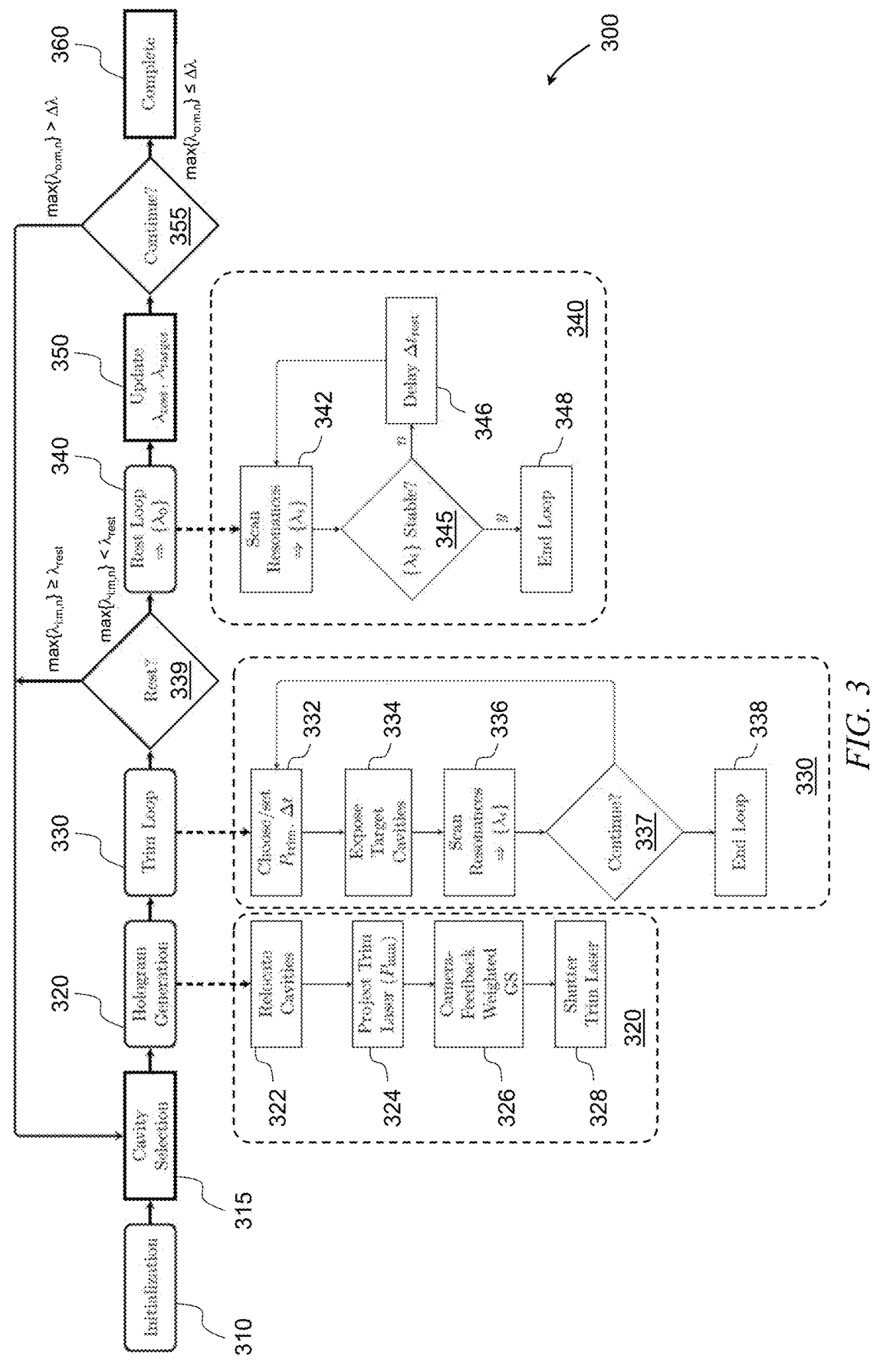
FIG. 3 is a flowchart depiction of a trimming process that can be used to precisely adjust and align the resonant wavelengths of a plurality of photonic crystal cavities in an array of cavities.

FIG. 3 provides further details of an example trimming process 300 that can be used to trim, in parallel, characteristics of a plurality of devices (e.g., microcavities such as photonic crystal cavities as described herein in further detail). The process 300 is not limited to only microcavities. The process can be used to adjust (trim) feature sizes or other characteristics in parallel for other integrated optical or non-optical devices, such as waveguide dimensions (to change a cut-off wavelength for a waveguide or to modify its dispersive properties), waveguide dispersion and/or effective index, micro-ring resonator characteristics where the micro-ring may or may not be used in an optical modulator, micro- or nano-pillar sizes (e.g. to tune vertical surface emitting cavities or metasurface components), micro-mirror characteristics, multimode interference coupler characteristics, slab defect cavity characteristics, MEMS oscillator characteristics, etc. The adjusted characteristic can be, for example, an operating characteristic such as resonant wavelength or a feature size such as hole diameter or layer thickness. The process can adjust dimensional sizes of features in an array of microfabricated devices to deep-sub-nanometer levels. The process 300 can begin with initialization 310 during which the locations and characteristics of devices in the array are initially determined. The devices can be located at each pixel of the array, with one or more devices per pixel. The locations of the devices can be determined from microfabrication records (e.g., pattern layout, metrology performed after fabrication, etc.) or can be determined from microscopy and/or metrology performed during initialization 310 or may be determined from a combination of microfabrication records and microscopy/metrology performed during initialization 310.

Characteristics of each device in the array can be measured during the initialization 310 procedure. For the example PhC cavity array 110, the array is imaged onto a camera and is illuminated with a tunable optical source, which can scan over a range of wavelengths near a design wavelength $\lambda_d$ for the array 110. Nominally, the design wavelength is intended to be the resonant wavelength for each of the pixels 115. Due to fabrication variations, the camera can detect peaks in reflected light at different wavelengths $\{\lambda_{p:m,n}\}$ over the scanned range of wavelengths for the pixels 115 (indicated by the subscript m,n) in the PhC cavity array 110.

Figure 4:
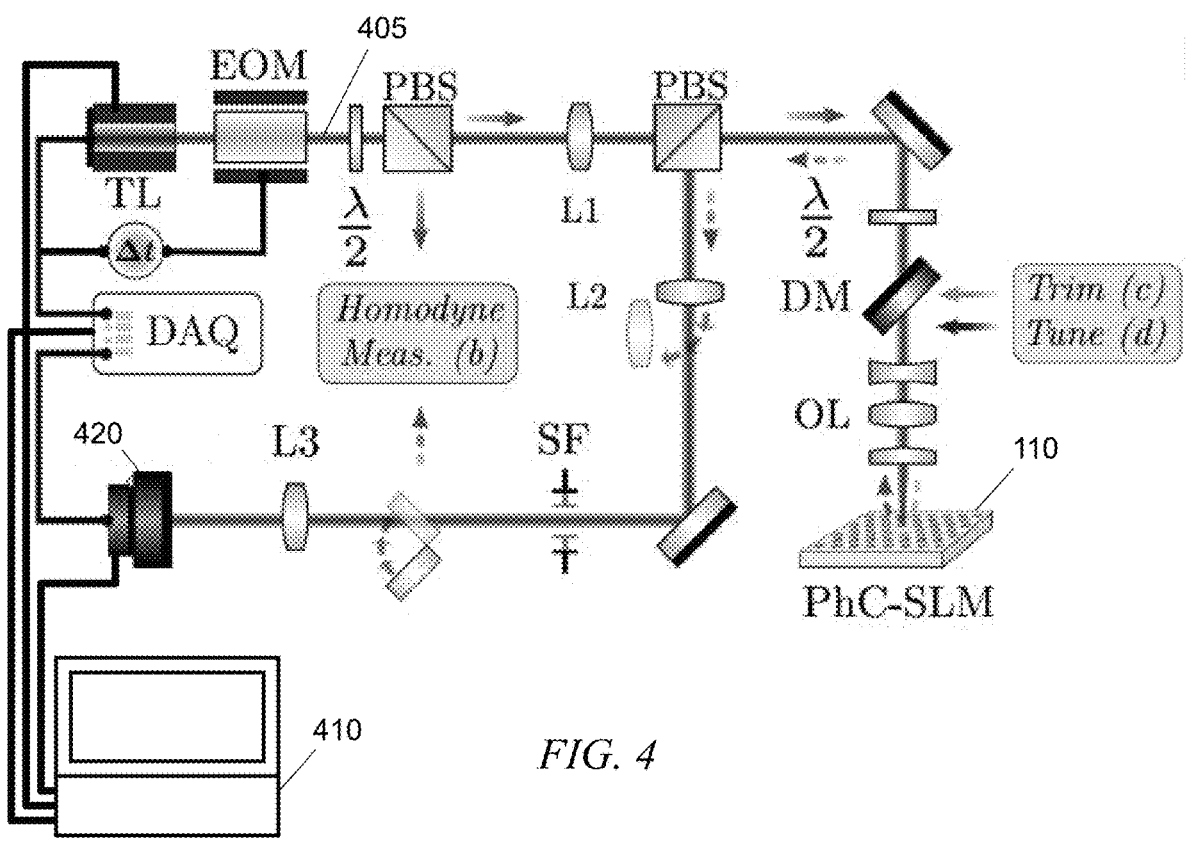
FIG. 4 depicts an optical system to image and measure reflected light from a plurality of optical microcavities in parallel.

FIG. 4 illustrates an example optical arrangement to image and measure reflected light from the PhC cavity array 110. A wide-field, cross-polarized microscope is used to simultaneously measure the reflection from every photonic crystal cavity within a camera's field-of-view. A visible illumination path (not illustrated) is joined with collimated infrared beam 405 from a tunable laser TL with a dichroic mirror (not shown) and focused onto the backfocal plane (BFP) of an objective lens OL by lens L1. The angle-of-incidence and spot size of the infrared beam 405 on the sample (here, the PhC-SLM 110) can be controlled by translating lens L1 and varying the diameter of the collimated infrared beam 405, respectively. In one example wide-field configuration, a 7.2 mm beam diameter focused to the center of a 40× objective's BFP can provide a ~150 μm waist-diameter, vertically-incident field that illuminates a 10×10 PhC cavity array with approximately uniform intensity across the array (e.g., less than 10% variation in intensity across the array).

By orienting the input polarization of the collimated infrared beam 405 at a 45° angle relative to the dominant cavity polarization axis (with a halfwave plate $\lambda/2$ or by physically rotating the PhC cavity array 110), light coupled into and reflected by the PhC cavity array 110 is polarization rotated and can be isolated from direct, specular reflections with a polarizing beam splitter PBS (right PBS in FIG. 4) that is also used to direct light for imaging and determining the wavelengths $\{\lambda_{p:m,n}\}$ at which the reflected intensity from the photonic crystal cavities in the array reach a peak value. A kHz-rate free-running camera 420 (a dual-band visible and infrared, or v-SWIR in the example implementation) images this cross-polarized reflection signal through a tube lens L3. For each frame collected from the camera 420 during a sweep of wavelengths by the tunable laser TL, the wavelength is interpolated from the recorded camera and laser output triggers. Each photonic crystal cavity's reflection is integrated over a fraction of pixels within its imaged unit-cell boundary. The resulting high-contrast reflection spectra (across all devices within the field-of-view) are processed by the system controller 410 to determine at least the initial resonant wavelength for each photonic crystal cavity in the array and to monitor the resonant wavelengths at various stages of the trimming process 300, as described further below.

Once the resonant wavelengths $\{\lambda_{p:m,n}\}$ are initially known for all the cavities in the array 110, a target resonant wavelength $\lambda_t$ can be chosen to which the cavities' resonant wavelengths can be adjusted by the trimming process 300. Since the trimming process 300 blue-shifts the wavelengths in this example, the target wavelength $\lambda_t$ is selected to be equal to or less than the shortest wavelength min $\{\lambda_{p:m,n}\}$ of the initially-measured resonant wavelengths $\{\lambda_{p:m,n}\}$.

The initialization 310 can also include a calibration process for the SLM 210 that will be used to form beamlets for the trimming process. In some implementations, a liquid crystal on silicon (LCOS) SLM is used for the SLM 210. The calibration of the SLM 210 can involve performing automated wavefront calibration routines that measure the Fourier-plane source amplitude and phase using a super-pixel interference technique to compensate for aberrations along the SLM imaging train. The calibration of the SLM can improve beamlet formation with the SLM.

The inventors have recognized and appreciated that there can be time-dependent shifts in the resonant wavelength of each photonic crystal cavity during the trimming process. Naturally, changes in temperature can shift the resonant wavelength of a photonic crystal cavity. To suppress changes in temperature, the PhC cavity array is thermally coupled to a Peltier cooler having feedback control (not shown in FIG. 4). The Peltier cooler can maintain a constant temperature throughout the trimming process to within 10 milliKelvin. However, focusing visible light (on the order of 10 milliwatts) onto the photonic crystal cavity (as is done during the trimming process 300 to sufficiently heat the semiconductor layer 119 for thermal oxidation) causes a temporary blue-shift $\Delta\lambda_{o:m,n}$ in the cavity's resonant wavelength due to the desorption of moisture attached to hydrophilic hydroxyl surface terminations. Accordingly, the adjustment of the resonant wavelength of a photonic crystal cavity or group of cavities by the trimming process can be set to an instantaneously measured wavelength value $\lambda_{i:m,n}$ that is less than the target wavelength $\lambda_t$ according to the following relation.

$$\lambda_{i:m,n}=\lambda_t-\Delta\lambda_{o:m,n} \qquad (1)$$

Over time (on the order of one minute), the measured instantaneous wavelength $\lambda_{i:m,n}$, when adjusted according to EQ. 1, relaxes to essentially a true resonant wavelength ($\sim\lambda_t$) of the cavity as moisture re-adsorbs to the surfaces of the semiconductor layer (e.g., to the hydroxyl surface terminations). In practice, the stability and estimation of the "overtune" amount $\Delta\lambda_{o:m,n}$ limit the uniformity and scale of the trimming process, respectively.

Returning to FIG. 3, following initialization 310, a number P of the devices (photonic crystal cavities in this example) are selected (act 315) to form a subset $S_1$ of the cavities in the array that will be trimmed first. The selection of the devices for this subset can depend upon how similarly they deviate from the target resonant wavelength $\lambda_t$ (for this example) or from a target characteristic in other applications. For example, the subset $S_1$ may consist of all devices having a resonant wavelength within 1 nm of a maximum deviation of all measured resonant wavelengths $\{\lambda_{p:m,n}\}$ from the target wavelength $\lambda_t$.

To improve trimming efficiency, the subset $S_1$ can be selected to maximize a total trimming distance $P(\mathrm{min}S_1\{\lambda_{i:m,n}\}-\lambda_t)$ to the target wavelength $\lambda_t$ for each iteration of the trimming loop 330. The total trimming distance for a candidate subset $S_1$ is the number of devices P selected for the candidate subset times the trimming distance that will bring the device in the candidate subset $S_1$ to the target wavelength. This approach finds the candidate subset $S_1$ that allows the largest amount of trimming to happen in a trimming loop before selecting a next subset of devices.

In some cases, all cavities are selected for the subset $S_1$ that have a resonant wavelength longer than lower-valued resonant wavelengths $\{\lambda_{min}\}$ measured for cavities of the PhC cavity array 110 that fall within in a range of shorter wavelengths. The range of shorter wavelengths can be selected to include wavelengths that are within an acceptable deviation of each other. The cavities in the PhC cavity array 110 having resonant wavelengths outside this range are selected for the subset $S_1$ so that they can be trimmed to ultimately have resonant wavelengths within this range.

To reduce undesirable effects of crosstalk (e.g., unwanted oxidation of a non-selected cavity), the number of microcavities in the subset $S_1$ can be reduced to limit the number of selected cavities that border a non-selected cavity. For example, a constraint can be imposed in the selection process that no more than one, two, three, or some other number of selected cavity(ies) can abut a non-selected microcavity. If the trimming process is performed on devices other than optical microcavities, the constraint may limit the number of selected devices for trimming that can border a non-selected device.

After cavity selection 315, holographic generation 320 of the beamlets 220 can be carried out. A phase mask is computed for the SLM 210 that will generate a plurality of beamlets having desired power ratios that are focused on the devices in subset $S_1$. Holographic generation 320 can comprise several steps, some of which may be iterated. The location of each microcavity selected for the subset $S_1$ is determined (act 322) from the images captured during initialization 310 and/or fabrication records.

To generate the phase mask for the SLM 210 that would produce the desired array of beamlets 220 on the selected cavities in $S_1$, an open-source, graphical processing unit (GPU)-accelerated holography software package was developed that implements fixed-phase, weighted Gerchberg-Saxton (GS) phase retrieval processes. Using camera feedback, the processes can generate thousands of near-diffraction-limited foci with ~1% peak-to-peak power uniformity (according to one implementation) and single-camera-pixel-order location accuracy within a few iterations. In some implementations, the power uniformity of the focused beamlets 220 can be to within 5% of an average power level for the plurality of optical beamlets 220. The open-source package, titled "slm-suite," was produced using the Python programming environment and simplifies the creation of highly-uniform, selected-geometry, optically-focused beamlets using various phase retrieval algorithms.

The holography package includes several features such as: 1) automated wavefront calibration routines that measure the Fourier-plane source amplitude and phase using a super-pixel interference technique to compensate for aberrations along the SLM imaging train, as mentioned above, 2) various GPU-accelerated Gerchberg-Saxton (GS) processes that use the measured source constraints to produce improved spot array phase masks, 3) automated affine transformations between grating wave vectors applied to the SLM and image-space coordinates (i.e., camera pixels) by projecting and detecting a GS-computed spot array, 4) camera-based feedback of measured spot amplitudes at known (calibrated) locations into phase retrieval algorithms to improve the uniformity of image-space spot arrays, 5) automated evaluation metrics to monitor diffraction efficiency, spot amplitude and position tolerance, and spot quality, and 6) simplified hardware interface and control.

In some cases, the power levels of the beamlets can be made uniform (e.g., to within 1% as described above), so that oxidation of each device in subset $S_1$ proceeds at essentially the same rate. In other cases, the power levels of the beamlets can be made non-uniform so that the devices in the subset $S_1$ form oxide layers at different rates corresponding to their resonant wavelength differences from the target wavelength $\lambda_t$. For example, a higher power can be used for a first device in $S_1$ that has a resonant wavelength farther from the target wavelength $\lambda_t$ than a second device in $S_1$ having a resonant wavelength closer to the target wavelength.

During the holographic generation 320, the trimming laser is projected (act 324, FIG. 3) onto the PhC cavity array 110 using a reduced power level such that the intensity detected by the camera 420 does not saturate. Images from the camera 420 are fed back (act 326) to the holography package to refine generation of the phase mask for the SLM 210. Once suitable beamlets 220 are produced and accurately located on the relevant pixels 115 in the PhC cavity array 110, the trimming laser CWTL can be shuttered (act 328) with a mirror 520 (FIG. 5; described below) so that average beamlet power or average intensity (or beamlet power or intensity) can be determined with a calibrated photodiode PD (or with an array of calibrated photodiodes).

Figure 6:
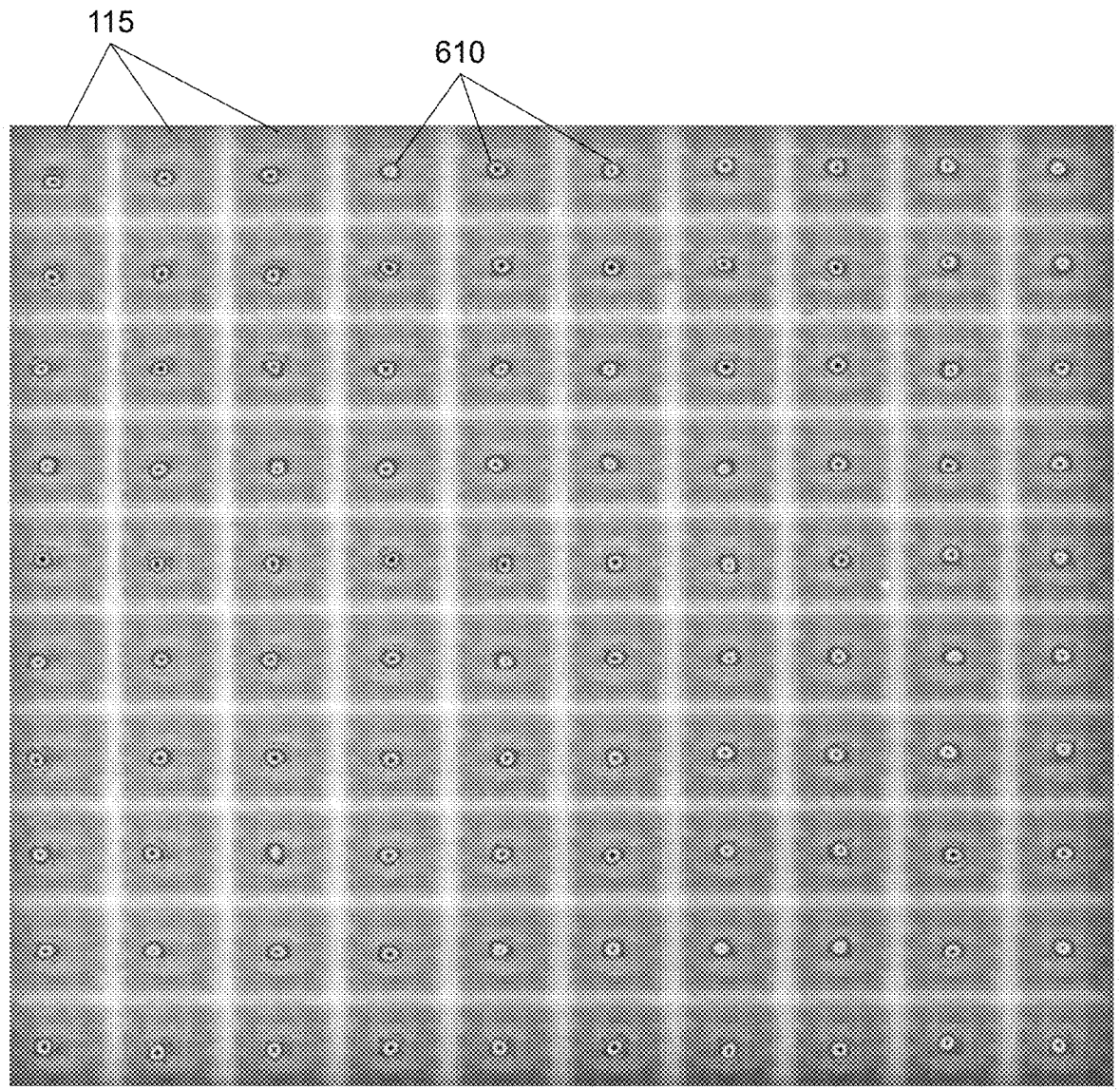
FIG. 6 is an image of a 10×10 array of beamlets formed from a single beam using the liquid crystal trimming setup of FIG. 5. The image also includes an image of a 10×10 array of photonic crystal cavities upon which the beamlets are focused.

FIG. 6 provides an example of the uniformity and placement accuracy that can be achieved with the holographic package and SLM 210 following holographic generation (act 320). The image overlays focal spots 610 of the beamlets 220 on a 10×10 array of pixels 115 of a PhC cavity array 110, both imaged with the camera 420. The results demonstrate ~1% power uniformity among the 100 beamlets and sub-micron placement accuracy. For this example, the pixel size is 8 microns by 7 microns, though other pixel sizes are possible (e.g., down to 5 microns by 5 microns or even less).

Figure 5:
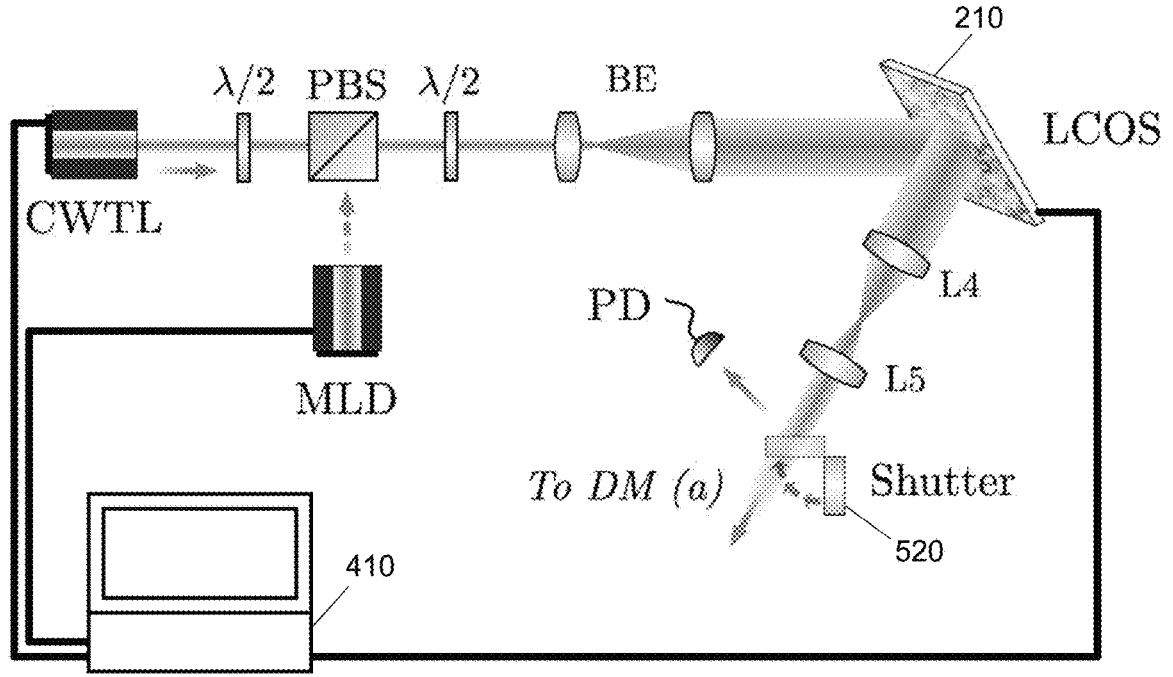
FIG. 5 depicts an optical system for precisely adjusting (i.e., "trimming") characteristics of a plurality of devices (such as the PhC-SLM of FIG. 1).

During a trimming loop (act 330), the selected cavities in subset $S_1$ are targeted by P beamlets 220 generated from the SLM 210, as depicted in FIG. 2A. Further details of the optical arrangement for trimming the cavities are illustrated in FIG. 5. A continuous wave trimming laser CWTL can be variably attenuated with a motorized half-wave plate $\lambda/2$, which precedes a polarizing beam splitter (PBS) and second half-wave plate. The beam from the trimming laser CWTL can be expanded to overfill the aperture of the SLM 210 (a LCOS SLM in this example). The SLM can be re-imaged onto the back-focal plane of the objective lens OL (see FIG. 4) using two lenses L4, L5 with focal lengths chosen to match the imaged SLM and objective pupil dimensions. The imaging onto the back-focal plane of the objective lens OL can be confirmed by acquiring an image with L2 in place using the camera 420.

The power in the trimming laser CWTL can be increased and resonant wavelengths for the selected cavities in subset $S_1$ can then be trimmed (act 330). The trimming can comprise a loop process that includes steps of selecting a power level $P_{trim}$ and exposure duration $\lambda_t$. The amount of power and duration of exposure can be computed (act 332) by the system controller 410 (e.g., based on currently measured trimming rates, resonant wavelength locations, and/or other parameters such as partial pressure of oxygen in the trimming environment) to locally grow a thermal oxide on the surface of the semiconductor layer 119 at the location of each selected cavity in the subset $S_1$. During the trimming loop, one or more parameters relating to trimming (oxidation rate, detuning rate, oxygen pressure, exposure power, power level $P_{trim}$, exposure duration $\Delta t$, etc.) can be monitored and updated as desired. The trimming laser CWTL can be un-shuttered to expose (act 334) and heat the selected cavities in the subset $S_1$ with the focused beamlets 220. During trimming, the resonant wavelength can shift at a rate as high as 0.1 nm/sec and as low as 1 pm/sec, which essentially corresponds to a change in thickness of the PhC cavities silicon layer thickness (due to oxidation of the layer). Controlling the duration of exposure (act 334) can control the amount of wavelength shift or change in resonant cavity dimension (e.g., silicon layer thickness). Changes in resonant wavelength or cavity dimension as small as one picometer (effectively less than one atomic layer) and as large as 10's of nanometers are possible when executing the trimming loop 330. In some implementations, the exposure may be interrupted before completion of the duration $\Delta t$ to scan (act 336) the PhC cavity with the tunable laser TL and measure the instantaneous resonant wavelengths $\{\lambda_{i:m,n}\}$ for at least the selected cavities. If all resonant wavelengths can be measured and their instantaneous resonant wavelengths $\{\lambda_{i:m,n}\}$ are equal to or greater than the target wavelength $\lambda_t$, then the trimming loop can continue (act 337) by returning to computing the power $P_{trim}$ and exposure duration $\Delta t$ to adjust the selected cavities toward an instantaneous wavelength that is shorter than the target resonant wavelength $\lambda_t$ according to EQ. 1 above.

In some implementations, if any of the resonant wavelengths for photonic crystal cavities in the trimmed subset $S_1$ have an instantaneous resonant wavelength $\lambda_{i:m,n}$ that is less than the target wavelength $\Delta_t$, then the trimming loop ends (act 338) and control passes to a rest decision point 339 where it is determined whether or not moisture should be allowed to re-adsorb to the semiconductor layer 119 so that the true resonant wavelengths $\{\lambda_{o:m,n}\}$ can be measured for the cavities in the array 110 using a rest loop (act 340). The decision of whether or not to execute the rest loop can depend, at least in part, on a comparison of the measured maximum instantaneous resonant wavelength value max $\{\lambda_{i:m,n}\}$ with an interim or rest wavelength $\lambda_{rest}$. The rest wavelength can be a value that is greater than the target wavelength $\lambda_t$ but less than an initially measured maximum resonant wavelength max $\{\lambda_{p:m,n}\}$. If the measured maximum instantaneous resonant wavelength value max $\{\lambda_{i:m,n}\}$ is greater than the rest wavelength $\lambda_{rest}$, then control of the trimming process 300 can return to cavity selection 310 where a second subset $S_2$ of cavities is selected based on criteria described above. The selected cavities that form the 17rim17dd subset $S_2$ may be the same as or different from the selected cavities that formed subset $S_1$. If the measured maximum instantaneous resonant wavelength value max $\{\lambda_{i:m,n}\}$ is less than the rest wavelength $\lambda_{rest}$, then control of the trimming process 300 can proceed to the rest loop (act 340).

The rest loop (act 340) can comprise several actions, as depicted in FIG. 3. The rest loop generally comprises making repeated measurements of the cavities' instantaneous resonant wavelengths (act 342) with time delays (act 346) between the measurements to allow moisture to re-adsorb to the semiconductor layer 119 of the PhC cavity array 110. The time delays $\Delta t_{rest}$ can be on the order of 10 seconds. The measurements are repeated until the instantaneous resonant wavelengths $\{\lambda_{i:m,n}\}$ stabilize to the true resonant wavelength values $\{\lambda_{o:m,n}\}$. Since the re-adsorption of moisture can be a relatively slow process, the rest loop (act 340) can take up to one minute or longer to complete. In response to the measured instantaneous resonant wavelengths $\{\lambda_{i:m,n}\}$ stabilizing to the new true resonant wavelength values $\{\lambda_{o:m,n}\}$, control of the trimming process 300 can proceed to an update step (act 350) where the rest wavelength $\lambda_{rest}$ can be changed to a value closer to the target wavelength $\lambda_t$. In some cases, the target wavelength can be changed (e.g., if the smallest measured true wavelength $\lambda_{o:m,n}$ is less than the target wavelength by an unacceptable amount).

Following the update (act 350), or prior to the update, the system controller 410 can check the values of measured true resonant wavelengths $\{\lambda_{o:m,n}\}$ to see whether they satisfy a criterion, which may have been entered by a user of the system. An example criterion may be that all measured true resonant wavelengths $\{\lambda_{o:m,n}\}$ fall within a narrow, acceptable range of wavelengths $\Delta\lambda$. This may be checked by comparing the difference between the measured maximum true resonant wavelengths max $\{\lambda_{o:m,n}\}$ and the measured minimum true resonant wavelengths min $\{\lambda_{o:m,n}\}$ with the acceptable range AA. Another criterion may be to compute, by the system controller 410, the standard deviation of measured true resonant wavelengths $\{\lambda_{o:m,n}\}$ and determine whether it is below a threshold value or within a range of values, which may be set by a user. Another criterion may be that all resonant wavelengths fall within an acceptable distance (e.g., 100 pm) from an average resonant wavelength determined for all cavities. Based on the evaluation of the resonant wavelength criterion, the system controller 410 can determine (act 355) whether to continue trimming the microcavities (and return to cavity selection 315) or whether the cavities have been adequately trimmed so that the process 300 is completed (act 360). Completion of the process can comprise storing and/or outputting at least resonant wavelength information for each microcavity in the array 110.

The system controller 410 can include at least one processor adapted with code to execute functionalities of the trimming process, as described above. The at least one processor can comprise a microprocessor, microcontroller, field-programmable gate array, programmable logic controller, digital signal processor, application specific integrated circuit, logic circuitry, or some combination thereof.

Because of the precision of the trimming process 300 and its ability to trim devices in parallel, very narrow ranges of resonant wavelengths are possible for a large number of devices formed on a substrate. For example, the standard deviation of measured resonant wavelengths for a plurality of photonic crystal cavities can be between approximately or exactly 1 pm and approximately or exactly 100 pm. In some cases, the standard deviation can be between approximately or exactly 1 pm and approximately or exactly 20 pm. In yet further implementations, the standard deviation can be between approximately or exactly 1 pm and approximately or exactly 5 pm, though smaller standard deviations may be possible. Alternatively, a measured resonant wavelength for any photonic crystal cavity can be within 100 pm, within 20 pm, or even within 5 pm of an average resonant wavelength determined for the plurality of photonic crystal cavities in a PhC cavity array 110. The number of devices measured on a substrate or chip can be from 25 to 100, from 64 to 400, or from 400 to 10,000. A larger number of devices may be possible for some implementations.

Although the trimming process 300 described above relates primarily to aligning optical resonant frequencies of photonic crystal cavities (and more generally, microcavities and other optically confining structures such as waveguides and micro-ring resonators), the trimming process can be used to align, in parallel, characteristics of these and other devices, whether or not they are in an array. In one example, the trimming process can be used to adjust the hole diameter of one or more nanoscale holes formed in a semiconductor material that can be oxidized. Oxidation of the semiconductor material around the hole can reduce the inner diameter of the hole. Measuring an amount of optical transmission through the hole or scattering from the hole may be one approach to monitor changes in hole diameter. In another example, the resonant frequency of a MEMS mechanical oscillator (e.g., a silicon resonator) or an oscillating cantilever (such as used for atomic force microscopy) can be adjusted and aligned using the trimming process 300.

Additionally, the trimming process is not limited to oxidation of a material to change a characteristic of the device(s) trimmed. The optical beamlets 220 can be used to affect a change in any photosensitive material that may be included in a device where the photoinduced change causes a change in at least one characteristic of the device. For example, a photochromatic film that changes refractive index when illuminated could be used. As another example, the beamlets 220 can be used to expose optical phase change materials (O-PCMs) that, when heated by the beamlets, causes the material to change from crystalline to amorphous. The phase change can change the refractive index and therefore resonant frequency of the phase change materials. Example O-PCMs include $Sb_2Se_3$, Ge—Sb—Te (GST) and Ge—Sb—Se—Te (GSST).

IV. Oxidation During Trimming

For thin oxide layers, the consumption of silicon during the reaction with ambient oxygen permanently blueshifts the cavity resonance in proportion to the oxide thickness. The inventors recognized and appreciated that oxidation rates of the semiconductor layer 119 could be improved during trimming by increasing the partial pressure of oxygen at the oxidation site. Per the Deal-Grove model, the rate-limiting diffusion of oxygen through the grown oxide accelerates with increasing oxygen pressure. Accordingly, the PhC cavity array 110 can be placed in a chamber so that oxygen can be supplied at elevated pressure. In some cases, the PhC cavity array 110 can be subjected to a pure oxygen environment at elevated pressure during oxidation.

The plots of FIG. 7A, FIG. 7B, and FIG. 7C demonstrate increased oxidation rates with elevated partial pressure of oxygen and elevate optical power. FIG. 7A plots optical trimming power focused on a photonic crystal cavity as a function of time. The power was stepped up from approximately 23 mW to approximately 38 mW over a period of 1400 seconds. The change in resonant frequency $\Delta\lambda$ was measured during oxidation (FIG. 7B) and the cavity's quality factor Q was also measured (FIG. 7C) during oxidation. Two measurement runs were made at two oxygen partial pressures: 0.14 atm (darker lines) and 4.0 atm (lighter lines).

The plots of FIG. 7B indicate that oxidation rates increase with increasing oxygen pressure on the semiconductor layer 119. A higher oxidation rate produces a larger change in resonant frequency $\Delta\lambda$. Further, the oxidation rates increase with increasing optical power on the semiconductor layer 119. The plots of FIG. 7B show a threshold behavior of oxidation rate with increasing optical power. For the measurements made at 4.0 atm $O_2$, the oxidation rate accelerates above approximately 31 mW. When performing the trimming process 300, the optical power can be progressively increased to reach a desired, wavelength-uniformity-dependent trimming rate. For example, the power can be adjusted near threshold for high-speed trimming when wavelength uniformity is poor. As uniformity improves, the power can be adjusted for slower, high-precision trimming below the threshold power. As evidenced by FIG. 7B, the oxidation and resonant wavelength trimming rate is relatively power-independent until reaching a threshold power. The threshold powers (above which oxidation accelerates) can be recorded for use when selecting the initial exposure power in each trimming loop. The partial pressure of oxygen can be in a range from approximately or exactly 0.2 atm to approximately or exactly 10 atm when performing the 20riming process 300, though lower or higher pressures may be used in some cases.

FIG. 7C indicates that there are relatively minor changes in the photonic crystal cavity's quality factor Q for the trimming distances (<10 nm) required for common microcavities. For example, the Q maintains a high value (~$3\times10^4$) and varies by less than 20% for a detuning of the resonant wavelength by over 15 nm. Over a certain range of detuning, the Q can even increase. Maintaining a high Q is important for the microcavity array 110 to maintain its resonant enhancement for optical modulation purposes.

V. Example Trimming Results

An 8×8 PhC cavity array 110 was fabricated using a customized foundry lithography process. The process involved patterning the array of cavities using deep-ultraviolet water-immersion photolithography and a customized etching process to achieve vertical sidewalls in the holes etched through the semiconductor layer 119. The diameters of the holes were as small as 100 nm.

The trimming process described above was implemented in a pure oxygen environment with partial pressure $P_{O2}=5$ bar. The elevated pressure enabled a trimming rate $d\lambda_o/dt$ of the cavity's resonant wavelength on the order of 0.1 nm/s over a range of wavelengths greater than 20 nm. The optical power on each microcavity was varied during the trimming process between 1 mW and 30 mW, depending on how close the measured resonant wavelength was to the target wavelength. The thickness of the silicon membrane used to make the microcavities was approximately 220 nm. The total time to trim all devices was about 8 hours, which was limited by moisture rehydration, rest periods, and ability to control the environment. In principle, total trimming times on the order of minutes are possible.

FIG. 8A and FIG. 8B demonstrate the results of the trimming process 300 applied to the 8×8 pixel PhC cavity array 110. Prior to trimming (FIG. 8A), the hyperspectral near-field reflection image shows a large resonant wavelength variation among the spatially uniform and high-fill-factor resonant modes. The variation in resonant wavelength is indicated by shading and normalized to the cavity linewidth. The standard deviation $\sigma_\lambda$ in measured resonant wavelengths was 532 pm. Variations of over 200 linewidths were measured for the as-fabricated device. The mean quality factor (Q) for the cavities was measured to be $1.6\times10^5$.

The holographic trimming process 300 reduced the wavelength standard deviation and peak-to-peak spread by more than a factor of 100, which is indicated in FIG. 8B. The standard deviation after trimming $\sigma_{\lambda,t}$ reduced to 2.5 pm. The peak-to-peak wavelength spread reduced to 1.3 linewidths. After trimming, all 64 photonic crystal cavities in the array can be resonantly excited with a common operating wavelength (e.g., coherent light from a laser). The mean quality factor and near-field reflection profile of the array remain largely unmodified throughout the trimming process.

FIG. 9A plots the measured resonant wavelengths of the cavities before trimming (left shaded circles) and after trimming (right shaded circles). All resonant wavelengths are blue-shifted and aligned to nearly the same value. FIG. 9B plots measured reflection intensity as a function of relative wavelength for each resonant cavity after trimming. The wavelength deviations are relative to the target wavelength $\lambda_t$ (indicated by the vertical gray line) for the devices. FIG. 9A and FIG. 9B more clearly show the several-order-of-magnitude improvement in the alignment of resonant wavelengths for the 64 photonic crystal cavities.

Since the standard deviation of resonant wavelengths Ca is directly related to the corresponding standard deviations in hole radius $\sigma_r$ and placement variability $\sigma_h$ with an o(1) design-dependent constant of proportionality, the oxidation and holographic trimming process described above can homogenize the effective dimensions of each microcavity to the picometer scale. These results are the first demonstration of parallel non-volatile microcavity trimming. The achievable precision in trimming is currently limited by environmental factors that could be overcome with stricter process control. Even without such improvements, the current uniformity, scale, and induced loss outperform the corresponding metrics of previous techniques and pave the way towards scalable, integrated photonics with high-Q resonators.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the components so conjoined, i.e., components that are conjunctively present in some cases and disjunctively present in other cases. Multiple components listed with "and/or" should be construed in the same fashion, i.e., "one or more" of the components so conjoined. Other components may optionally be present other than the components specifically identified by the "and/or" clause, whether related or unrelated to those components specifically identified. Thus, as a non-limiting example, a reference to "A and/or B", when used in conjunction with open-ended language such as "comprising" can refer, in one embodiment, to A only (optionally including components other than B); in another embodiment, to B only (optionally including components other than A); in yet another embodiment, to both A and B (optionally including other components); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of components, and, optionally, additional unlisted items. Only terms clearly indicated to the contrary, such as "only one of" or "exactly one of," or, when used in the claims, "consisting of," will refer to the inclusion of exactly one component of a number or list of components. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used herein in the specification and in the claims, the phrase "at least one," in reference to a list of one or more components, should be understood to mean at least one component selected from any one or more of the components in the list of components, but not necessarily including at least one of each and every component specifically listed within the list of components and not excluding any combinations of components in the list of components. This definition also allows that components may optionally be present other than the components specifically identified within the list of components to which the phrase "at least one" refers, whether related or unrelated to those components specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including components other than B); in another embodiment, to at least one, optionally including more than one, B, with no A present (and optionally including components other than A); in yet another embodiment, to at least one, optionally including more than one, A, and at least one, optionally including more than one, B (and optionally including other components); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for adjusting characteristics of a plurality of microfabricated devices in parallel, the method comprising:
   measuring an initial characteristic of each microfabricated device of the plurality of microfabricated devices;
   determining, based on the initial characteristics for each microfabricated device, a target characteristic;
   selecting two or more microfabricated devices from among the plurality of microfabricated devices whose characteristics should be adjusted toward the target characteristic;
   directing a plurality of optical beams onto the two or more microfabricated devices to thereby adjust in parallel the characteristics of the two or more microfabricated devices toward the target characteristic;
   measuring in parallel an adjusted characteristic of each microfabricated device of the two or more microfabricated devices; and
   determining whether the adjusted characteristics measured for the two or more microfabricated devices are within an acceptable range of values.

2. The method of claim 1, further comprising:
   heating the two or more microfabricated devices with the plurality of optical beams; and
   forming a layer of oxide on each microfabricated device of the two or more microfabricated devices.

3. The method of claim 2, wherein the layer of oxide has a same thickness on each microfabricated device of the two or more microfabricated devices that have their characteristics adjusted in parallel.

4. The method of claim 2, further comprising limiting a number of the selected two or more microfabricated devices that border a non-selected microfabricated device of the plurality of microfabricated devices to reduce unwanted oxidation of the non-selected microfabricated device.

5. The method of claim 1, wherein each microfabricated device of the plurality of microfabricated devices comprises an optical waveguide.

6. The method of claim 1, wherein each microfabricated device of the plurality of microfabricated devices comprises an optical modulator having a micro-ring resonator and the characteristic is a resonant frequency of the micro-ring resonator.

7. The method of claim 1, wherein each microfabricated device of the plurality of microfabricated devices comprises an optical microcavity formed in a semiconductor layer and the characteristic is a resonant wavelength of the optical microcavity.

8. The method of claim 7, wherein the acceptable range of values is a standard deviation of the resonant wavelengths measured for each optical microcavity, the standard deviation having a value between 1 picometer (pm) and 100 pm.

9. The method of claim 7, wherein the acceptable range of values is a standard deviation of the resonant wavelengths measured for each optical microcavity, the standard deviation having a value between 1 pm and 20 pm.

10. The method of claim 7, wherein the acceptable range of values is a standard deviation of the resonant wavelengths measured for each optical microcavity, the standard deviation having a value between 1 pm and 5 pm.

11. The method of claim 7, further comprising waiting for a period of time after exposing in parallel each microfabricated device of the two or more microfabricated devices to allow moisture to re-adsorb to the optical microcavity.

12. The method of claim 1, further comprising forming the plurality of optical beams from a single optical beam using a phase mask, such that each optical beam of the plurality of optical beams has a same power level to within 5% of an average power level for the plurality of optical beams.

* * * * *